United States Patent
Suzuki et al.

(10) Patent No.: US 10,630,130 B2
(45) Date of Patent: Apr. 21, 2020

(54) COMPRESSOR FOR COMPRESSING REFRIGERANT AND HAVING A MOTOR WITH INSULATOR TOOTH PORTIONS

(71) Applicant: FUJITSU GENERAL LIMITED, Kanagawa (JP)

(72) Inventors: Takashi Suzuki, Kanagawa (JP); Tomoki Nishio, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 364 days.

(21) Appl. No.: 15/718,908

(22) Filed: Sep. 28, 2017

(65) Prior Publication Data

US 2018/0097419 A1    Apr. 5, 2018

(30) Foreign Application Priority Data

Sep. 30, 2016    (JP) .................................. 2016-195020

(51) Int. Cl.
*H02K 3/44*    (2006.01)
*H02K 1/20*    (2006.01)
(Continued)

(52) U.S. Cl.
CPC ............. *H02K 3/44* (2013.01); *F04C 23/008* (2013.01); *F04C 29/0085* (2013.01);
(Continued)

(58) Field of Classification Search
CPC .. H02K 3/44; H02K 3/24; H02K 3/38; H02K 3/522; H02K 1/20; H02K 7/14;
(Continued)

(56) References Cited

U.S. PATENT DOCUMENTS 4,431,356 A * 2/1984 Lassota .................... F01B 7/20
                                                    417/372
6,102,160 A * 8/2000 Cornelius ........... F04B 39/0246
                                                    184/43
(Continued)

FOREIGN PATENT DOCUMENTS

CN    101584100 A    11/2009
CN    101926073 A    12/2010
(Continued)

OTHER PUBLICATIONS

English translation for JP 2013-117188A which is the prior art cited and used for rejection in Notification of Reasons for Refusal of JP 2016-195020. (Year: 2013).*

(Continued)

*Primary Examiner* — Emily P Pham
(74) *Attorney, Agent, or Firm* — Paratus Law Group, PLLC

(57) ABSTRACT

A compressor includes a shaft, a motor portion, and a compressor portion. The motor portion rotates the shaft. The compressor portion compresses refrigerant by rotation of the shaft. The motor portion has an upper insulator, a stator core, and a winding wire. The upper insulator has a plurality of insulator tooth portions. The stator core has a plurality of stator core tooth portions corresponding to the plurality of insulator tooth portions of the upper insulator. The plurality of stator core tooth portions of the stator core are respectively covered with a plurality of teeth of the upper insulator and are respectively wound around thereof by the winding wire. The insulator tooth portion of the upper insulator has a groove through which lubricant oil poured into the compressor portion passes on a stator core contacting surface which is in contact with the stator core tooth portion of the stator core.

7 Claims, 10 Drawing Sheets

(51) Int. Cl.

| | | |
|---|---|---|
| *H02K 9/19* | (2006.01) | |
| *H02K 7/14* | (2006.01) | |
| *H02K 3/24* | (2006.01) | |
| *H02K 3/52* | (2006.01) | |
| *F04C 29/04* | (2006.01) | |
| *F04C 23/00* | (2006.01) | |
| *F04C 29/02* | (2006.01) | |
| *F04C 29/00* | (2006.01) | |
| *F25B 31/00* | (2006.01) | |
| *H02K 3/38* | (2006.01) | |
| *F04C 18/356* | (2006.01) | |

(52) U.S. Cl.
CPC .......... *F04C 29/026* (2013.01); *F04C 29/045* (2013.01); *F25B 31/002* (2013.01); *H02K 1/20* (2013.01); *H02K 3/24* (2013.01); *H02K 3/38* (2013.01); *H02K 3/522* (2013.01); *H02K 7/14* (2013.01); *H02K 9/19* (2013.01); *F04C 18/356* (2013.01); *F04C 2240/40* (2013.01); *F25B 2500/16* (2013.01); *H02K 2203/12* (2013.01)

(58) Field of Classification Search
CPC .... H02K 9/19; H02K 2203/12; F04C 23/008; F04C 29/0085; F04C 29/026; F04C 29/045; F04C 18/356; F04C 2240/40; F25B 31/002; F25B 2500/16
See application file for complete search history.

(56) References Cited

U.S. PATENT DOCUMENTS

| | | | | |
|---|---|---|---|---|
| 6,623,253 | B1 * | 9/2003 | Onoda | F04B 35/04 310/59 |
| 7,377,110 | B2 * | 5/2008 | Sheridan | B01D 45/14 60/39.08 |
| 8,029,255 | B2 * | 10/2011 | Morozumi | F04C 29/02 184/6.18 |
| 8,147,229 | B2 * | 4/2012 | Gopinathan | F04C 18/0215 418/270 |
| 9,742,242 | B2 | 8/2017 | Watanabe et al. | |
| 2004/0191094 | A1 * | 9/2004 | Kojima | F04B 35/04 417/415 |
| 2009/0184591 | A1 * | 7/2009 | Hoshino | H02K 3/24 310/54 |
| 2009/0285702 | A1 * | 11/2009 | Morimoto | F04C 18/322 417/410.1 |
| 2010/0096945 | A1 * | 4/2010 | Tsukamoto | F04C 18/3564 310/215 |
| 2010/0296950 | A1 * | 11/2010 | Kataoka | F04B 39/0238 417/410.1 |
| 2011/0156510 | A1 * | 6/2011 | Okada | H02K 1/20 310/54 |
| 2011/0243768 | A1 * | 10/2011 | Taema | H02K 3/522 417/410.1 |
| 2011/0285240 | A1 * | 11/2011 | Tsukamoto | H02K 3/522 310/215 |
| 2012/0019092 | A1 * | 1/2012 | Kataoka | F04B 35/04 310/215 |
| 2015/0028727 | A1 | 1/2015 | Watanabe et al. | |
| 2015/0035404 | A1 * | 2/2015 | Taema | H02K 3/34 310/208 |
| 2017/0218954 | A1 * | 8/2017 | Nishimura | F04C 18/3564 |

FOREIGN PATENT DOCUMENTS

| | | |
|---|---|---|
| CN | 103875164 A | 6/2014 |
| CN | 104067484 A | 9/2014 |
| DE | 11 2012 004 272 T5 | 7/2014 |
| EP | 2 113 987 A1 | 11/2009 |
| EP | 2 244 354 A1 | 10/2010 |
| EP | 3 057 206 A1 | 8/2016 |
| JP | 2003-097439 A | 4/2003 |
| JP | 2013-117188 A | 6/2013 |

OTHER PUBLICATIONS

Feb. 8, 2018, European Search Report issued for related EP application No. 17194199.0.

Jul. 24, 2018, Japanese Office Action issued for related JP Application No. 2016-195020.

Nov. 21, 2019, Chinese Office Action issued for related CN Application No. 201710909090.X.

* cited by examiner

COMPRESSOR FOR COMPRESSING REFRIGERANT AND HAVING A MOTOR WITH INSULATOR TOOTH PORTIONS

CROSS-REFERENCE TO RELATED APPLICATION

This application is based upon and claims the benefit of priorities from Japanese Patent Application No. 2016-195020 filed on Sep. 30, 2016; the entire contents of which are incorporated herein by reference.

FIELD

The technique of the present disclosure relates to a compressor.

BACKGROUND

A sealed compressor is known in which a compressor portion and a motor portion are sealed inside a housing (container). The compressor portion compresses refrigerant using a rotation force generated by the motor portion. In a stator of the motor portion, a winding wire is wound around a stator core via an insulator. The insulator has a flange portion on a rotor side so that so-called winding spillage that the winding wire disengages from the stator core to the rotor side does not occur when the winding wire is wound around the stator cores (see JP-A-2003-97439).

It is known that such a compressor generally has a problem that lubricant oil that lubricates the compressor portion is discharged to an outside portion of the compressor along with the refrigerant, and thus the lubricant oil in the compressor is reduced.

SUMMARY

The technique of the disclosure is achieved in view of the point described above and an object thereof is to provide a compressor that circulates lubricant oil inside a container that stores a compressor portion and a motor portion and prevents decrease in the lubricant oil inside the compressor.

In an aspect of the disclosure, a compressor includes: a shaft; a motor that has a rotor fixed to the shaft; a compressor portion that compresses refrigerant by rotation of the shaft; and a container that stores the shaft, the motor, and the compressor portion therein. The motor includes an insulator in which a plurality of insulator tooth portions are formed, a stator core in which a plurality of stator core tooth portions corresponding to the plurality of insulator tooth portions are formed, and a plurality of winding wires that are wound around the stator core tooth portions and the insulator tooth portions. In at least one of the plurality of insulator tooth portions, a groove through which lubricant oil poured into the compressor portion passes is formed on a surface which is in contact with the stator core tooth portion.

The compressor of the disclosure can circulate lubrication oil inside the container that stores the compressor portion and motor portion and can prevent a decrease in lubricant oil inside the compressor portion.

DESCRIPTION OF EMBODIMENTS

Figure 1:
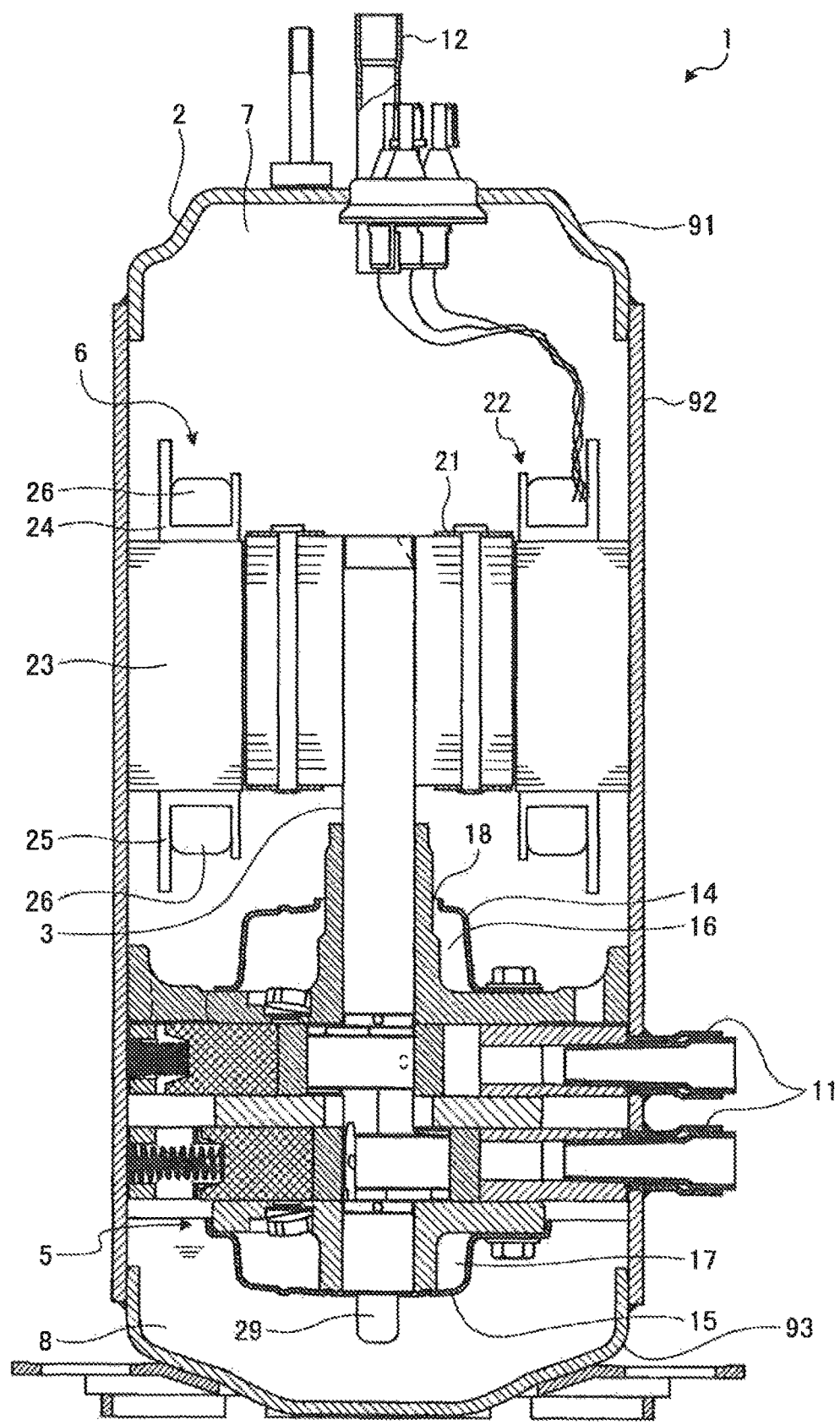
FIG. 1 is a longitudinal sectional view illustrating a compressor of an embodiment.

Hereinafter, a compressor according to an embodiment disclosed in the present application will be described with reference to the drawings. The technique of the present disclosure is not to be limited by the following description. In addition, in the following description, the same reference numerals are given to the same constituent elements and overlapping description will be omitted.

Compressor

FIG. 1 is a longitudinal sectional view illustrating a compressor of an embodiment. As illustrated in FIG. 1, the compressor 1 includes a container 2, a shaft 3, a compressor portion 5, and a motor portion 6. The container 2 includes an upper case 91, an outer body 92, and a lower case 93. The outer body 92 has a generally cylindrical shape. In the container 2, the upper case 91 closes one end of the outer body 92 and the lower case 93 closes the other end of the outer body 92, and thus a sealed inner space 7 is formed. The inner space 7 has a generally cylindrical columnar shape. The compressor 1 is formed such that an axis of a cylindrical column of the inner space 7 is parallel to the vertical direction when the container 2 is vertically placed on a horizontal surface. In the container 2, an oil reservoir 8 is formed at a lower portion of the inner space 7. Lubricant oil for lubricating the compressor portion 5 is stored in the oil reservoir 8. An inlet pipe 11 and a discharge pipe 12 are connected to the container 2. The shaft 3 has a rod shape and is disposed in the inner space 7 of the container 2 so that one end thereof is disposed on the oil reservoir 8. The shaft 3 is supported by the container 2 so as to be rotatable about a rotation shaft parallel to the axis of the cylindrical column formed by the inner space 7.

The compressor portion 5 is disposed on a lower portion of the inner space 7 and is disposed above the oil reservoir 8. Further, the compressor 1 includes an upper muffler cover 14 and a lower muffler cover 15. The upper muffler cover 14 is disposed on an upper portion of the compressor portion 5 in the inner space 7. The upper muffler cover 14 has an upper muffler chamber 16 therein. The lower muffler cover 15 is disposed at a lower portion of the compressor portion 5 in the inner space 7 and is disposed above the oil reservoir 8. The lower muffler cover 15 has a lower muffler chamber 17 therein. The lower muffler chamber 17 communicates with the upper muffler chamber 16 via a communication passage (not illustrated) formed on the compressor portion 5. A compressed refrigerant discharge hole 18 is formed between the upper muffler cover 14 and the shaft 3, and the upper muffler chamber 16 communicates with the inner space 7 via a compressed refrigerant discharge hole 18.

The compressor 1 is a so-called rotary type compressor, compresses refrigerant which is supplied from the inlet pipe 11 to the inner space 7 by rotation of the shaft 3, and supplies the compressed refrigerant to the upper muffler chamber 16 and the lower muffler chamber 17. The refrigerant is compatible with lubricant oil.

The motor portion 6 is disposed above the compressor portion 5 in the inner space 7. The motor portion 6 has a rotor 21 and a stator 22. The rotor 21 has a generally cylindrical column shape and fixed to the shaft 3. The stator 22 has a generally cylindrical shape and is disposed so as to surround the rotor 21 and is fixed to the container 2. The stator 22 has a stator core 23, an upper insulator 24, a lower insulator 25, and a plurality of winding wires 26. The upper insulator 24 is disposed above the stator 22. The lower insulator 25 is disposed below the stator 22.

Stator Core

Figure 2:
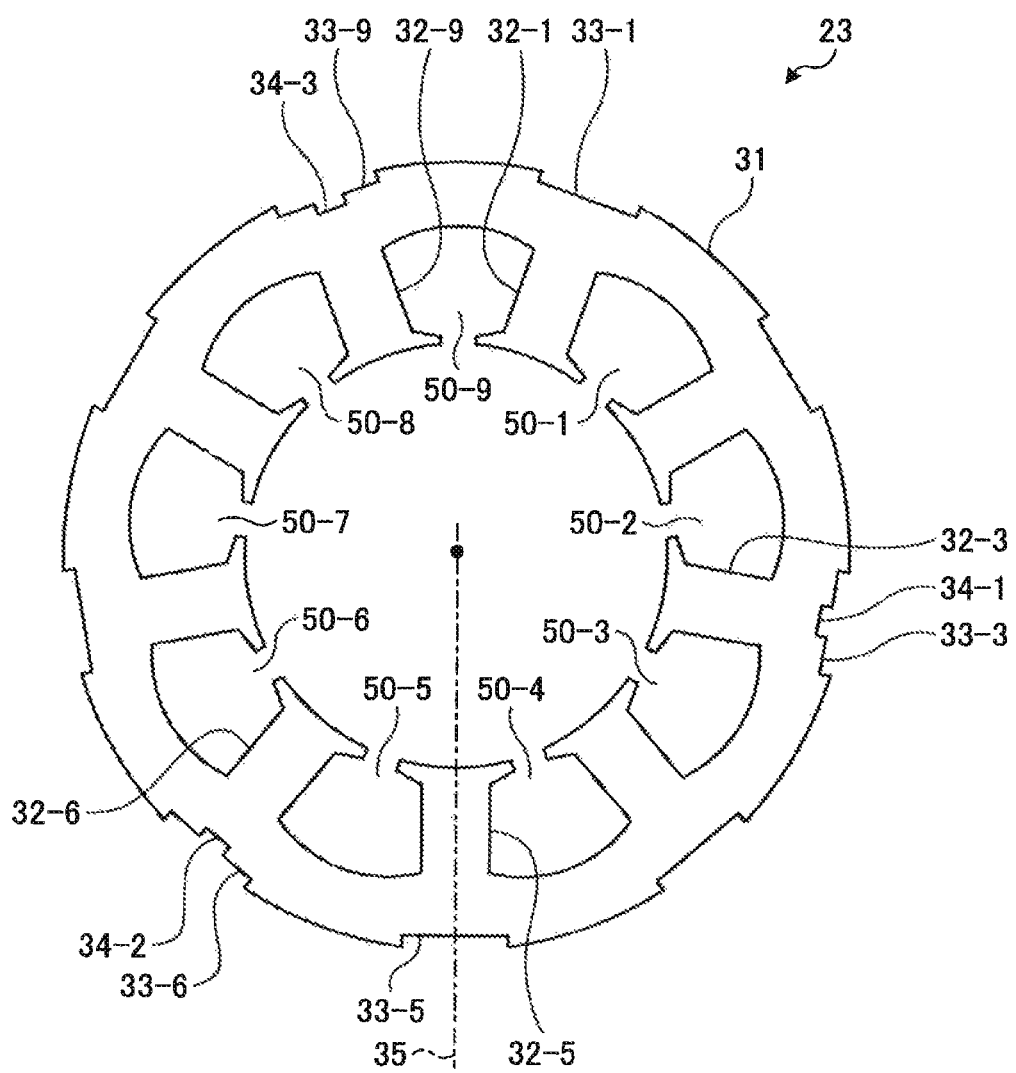
FIG. 2 is a plan view illustrating a stator core.

FIG. 2 is a plan view illustrating a stator core. The stator core 23 is formed by stacking a plurality of steel plates formed of a soft magnetic material such as a silicon steel sheet and includes a yoke portion 31 and a plurality of stator core tooth portions 32-1 to 32-9, as illustrated in FIG. 2. The yoke portion 31 has a generally cylindrical shape. Any stator core tooth portion 32-$i$ ($i$=1, 2, 3, . . . , 9) of the plurality of stator core tooth portions 32-1 to 32-9 is formed so as to overlap an imaginary plane 35 which overlaps an axis of a cylinder of the yoke portion 31 and to protrude from an inner circumferential surface of the yoke portion 31. The plurality of stator core tooth portions 32-1 to 32-9 are formed so as to be disposed on the inner circumferential surface of the yoke portion 31 at equal intervals of 40 degrees. Further, the stator 22 includes a plurality of slots 50-1 to 50-9. The plurality of slots 50-1 to 50-9 are respectively formed between the plurality of the stator core tooth portions 32-1 to 32-9.

The stator cores 23 have a plurality of cutout portions 33-1 to 33-9. The plurality of cutout portions 33-1 to 33-9 are formed on an outer circumferential surface facing an inner wall of the container 2 on the yoke portion 31 and correspond to the plurality of stator core tooth portions 32-1 to 32-9. The cutout portion 33-$i$ of the plurality of cutout portions 33-1 to 33-9 corresponding to the stator core tooth portion 32-$i$ is formed so as to overlap the imaginary plane 35 that overlaps the stator core tooth portion 32-$i$, that is, is disposed in the vicinity of the end which is integrally formed with the yoke portion 31 of the stator core tooth portion 32-$i$.

In the stator core 23, a plurality of concave portions 34-1 to 34-3 are further formed on the yoke portion 31. The first concave portion 34-1 of the plurality of concave portions 34-1 to 34-3 is formed at a bottom of the cutout portion 33-3 of the plurality of cutout portions 33-1 to 33-9. The second concave portion 34-2 of the plurality of concave portions 34-1 to 34-3 is formed at the bottom of the cutout portion 33-6 of the plurality of cutout portions 33-1 to 33-9. The third concave portion 34-3 of the plurality of concave portions 34-1 to 34-3 is formed at the bottom of the cutout portion 33-9 of the plurality of cutout portions 33-1 to 33-9.

Insulator

Figure 3:
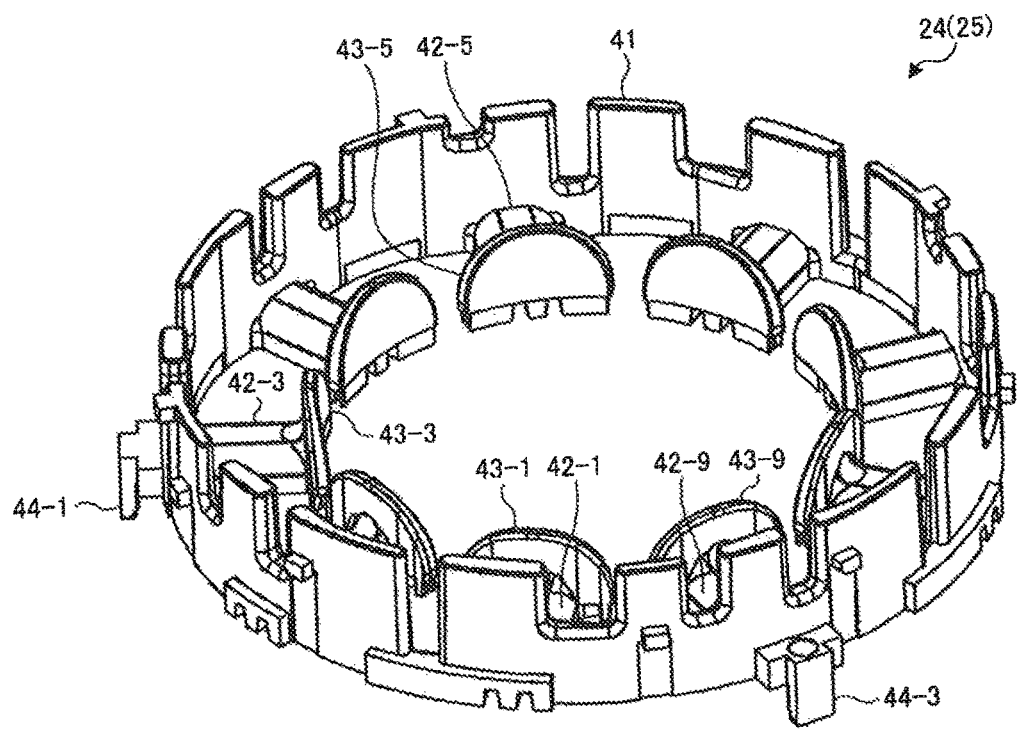
FIG. 3 is a perspective view illustrating an insulator.
Figure 5:
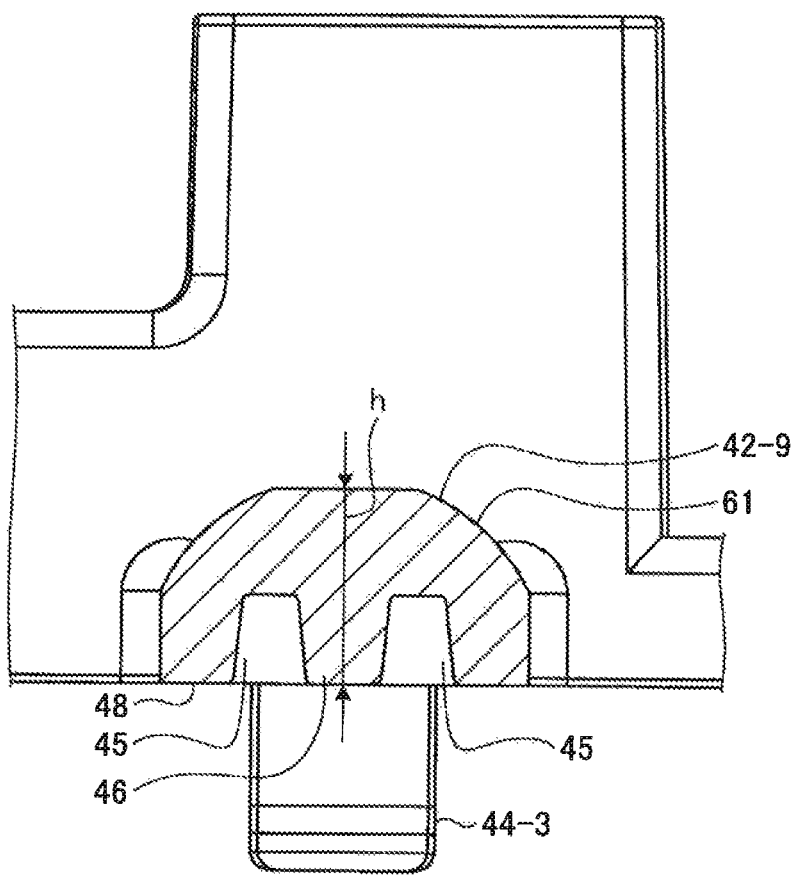
FIG. 5 is a sectional view taken along line V-V of FIG. 4.

FIG. 3 is a perspective view illustrating an insulator. The upper insulator 24 is formed of a polybutylene terephthalate resin (PBT), for example, and includes an outer circumferential wall portion 41, a plurality of insulator tooth portions 42-1 to 42-9, a plurality of flange portions 43-1 to 43-9, and a plurality of claw portions 44-1 to 44-3, as illustrated in FIG. 3. The outer circumferential wall portion 41 has a generally cylindrical shape. As illustrated in FIG. 5, any insulator tooth portion 42-$i$ of the plurality of insulator tooth portions 42-1 to 42-9 is formed in the form of a straight column body having a generally semicircular cross-section. One end of the insulator tooth portion 42-$i$ is formed integrally with an inner circumferential surface of the outer circumferential wall portion 41, that is, is formed so as to protrude from the inner circumferential surface of the outer circumferential wall portion 41. The plurality of insulator tooth portions 42-1 to 42-9 are formed on the inner circumferential surface of the outer circumferential wall portion 41 so as to be disposed at equal intervals of 40 degrees. The plurality of insulator tooth portions 42-1 to 42-9 correspond to the plurality of stator core tooth portions 32-1 to 32-9 of the stator core 23.

The plurality of flange portions 43-1 to 43-9 correspond to the plurality of insulator tooth portions 42-1 to 42-9 and have a generally semicircular plate shape, respectively. The flange portion 43-$i$ of the plurality of flange portions 43-1 to 43-9 corresponding to the insulator tooth portion 42-$i$ is integrally formed with the other end which is a side opposite to the one end of the insulator tooth portion 42-$i$ described above.

The plurality of claw portions 44-1 to 44-3 are formed so as to protrude from the outer circumferential surface of the outer circumferential wall portion 41. A first claw portion 44-1 of the plurality of claw portions 44-1 to 44-3 is formed in the vicinity of the insulator tooth portion 42-3 of the plurality of the insulator tooth portions 42-1 to 42-9. A second claw portion 44-2 of the plurality of claw portions 44-1 to 44-3 is formed in the vicinity of the insulator tooth portion 42-6 of the plurality of the insulator tooth portions 42-1 to 42-9. A third claw portion 44-3 of the plurality of claw portions 44-1 to 44-3 is formed in the vicinity of the insulator tooth portion 42-9 of the plurality of the insulator tooth portions 42-1 to 42-9. The plurality of claw portions 44-1 to 44-3 correspond to the plurality of concave portions 34-1 to 34-3 of the stator cores 23, and the claw portion 44-$j$ ($j$=1, 2, and 3) of the plurality of claw portions 44-1 to 44-3 corresponds to the concave portion 34-$j$ of the plurality of concave portions 34-1 to 34-3.

Figure 4:
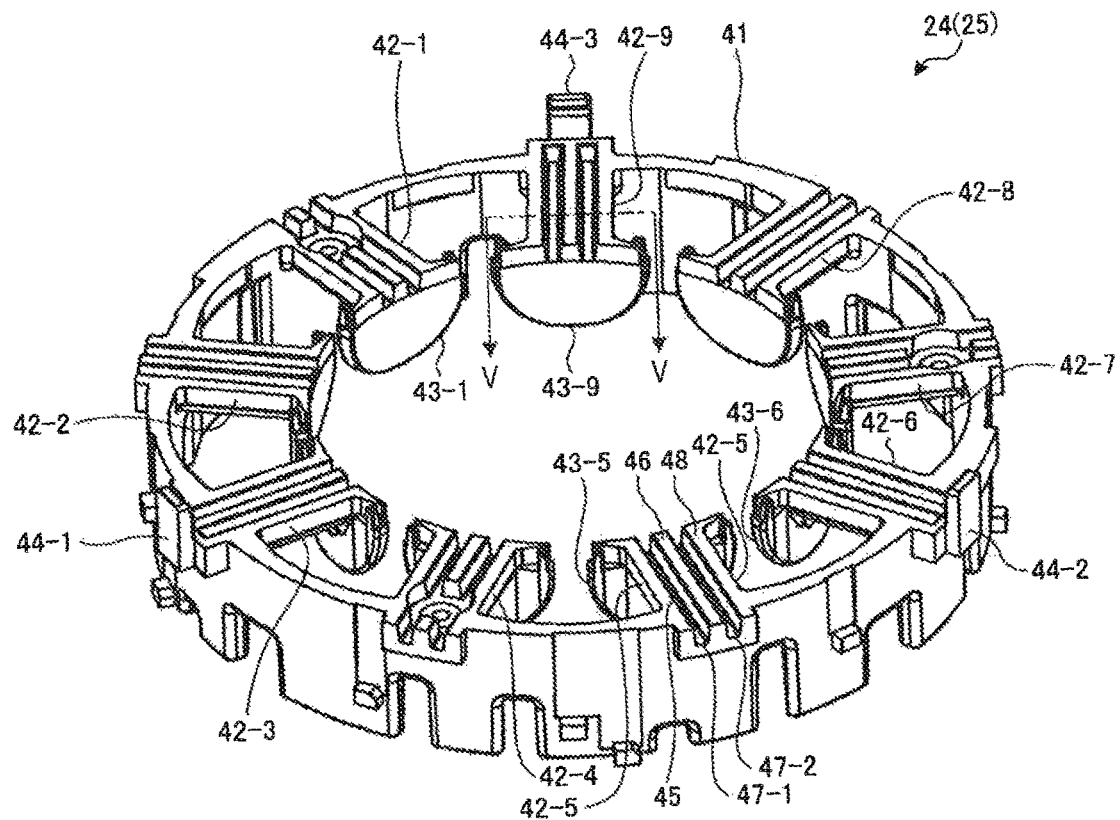
FIG. 4 is a perspective view illustrating a stator core contacting surface of the insulator.

FIG. 4 is a perspective view illustrating a stator core contacting surface of the insulator. As illustrated in FIG. 4, any insulator tooth portion 42-$i$ of the plurality of insulator tooth portions 42-1 to 42-9 has a stator core contacting surface 48. The stator core contacting surface 48 is formed to be flat, that is, is formed from a side surface which is a flat side surface of side surfaces of the straight column body on which the insulator tooth portion 42-$i$ is formed. The upper insulator 24 is formed so that, the respective stator core contacting surfaces 48 of the plurality of insulator tooth portions 42-1 to 42-9 are overlapped on the same plane and so that the respective stator core contacting surfaces 48 of the plurality of insulator tooth portions 42-1 to 42-9 is flush with an end surface of the outer circumferential wall portion 41 on a stator core 23 side. Further, the upper insulator 24 is formed such that the stator core contacting surface 48 of the insulator tooth portion 42-$i$ overlaps an end surface of the flange portion 43-$i$ on the stator core 23 side on the same plane.

Further, in the insulator tooth portion 42-$i$, a groove 45 is formed on the stator core contacting surface 48. The groove 45 is formed so as to connect from the other end of the insulator tooth portion 42-$i$ on which the flange portion 43-$i$ is integrally formed to one end thereof which is integrally formed on the outer circumferential wall portion 41. Further, the insulator tooth portion 42-$i$ has a partition 46. The partition 46 has a plate-like shape and protrudes from a bottom of the groove 45. Further, the partition 46 is formed such that the other end which is a side opposite to one end integrally formed on the bottom of the groove 45 overlaps the stator core contacting surface 48 on the same plane. Further, the partition 46 divides an inside portion of the groove 45 into two grooves (hereinafter, referred to as sub-groove 47-1 to sub-groove 47-2). In addition, although the partitions 46 of the insulator tooth portion 42-2, the insulator tooth portion 42-3, the insulator tooth portion 42-5, the insulator tooth portion 42-6, the insulator tooth portion 42-8, and the insulator tooth portion 42-9 are continuously formed from the inner circumferential side to the outer circumferential side of the stator core 23, the partition may be cut in the middle of the groove 45 as the partitions 46 of the insulator tooth portion 42-*i*, the insulator tooth portion 42-4, and of the insulator tooth portion 42-7.

FIG. 5 is a sectional view taken along line V-V of FIG. 4. As illustrated in FIG. 5, the insulator tooth portion 42-9 has a curved surface 61. The curved surface 61 is a surface other than the stator core contacting surface 48 on a surface of the insulator tooth portion 42-9 and is formed on a side on the insulator tooth portion 42-9 which is opposite to the stator tore contacting surface 48 in the axial direction. (axial direction of inner space 7). The curved surface 61 is gently curved so that the height h becomes gradually higher as the curved surface approaches to a center side of the insulator tooth portion 42-9 in the circumferential direction. Other insulator tooth portions 42-1 to 42-8 are formed in the same manner as that of the insulator tooth portion 42-9.

Figure 6:
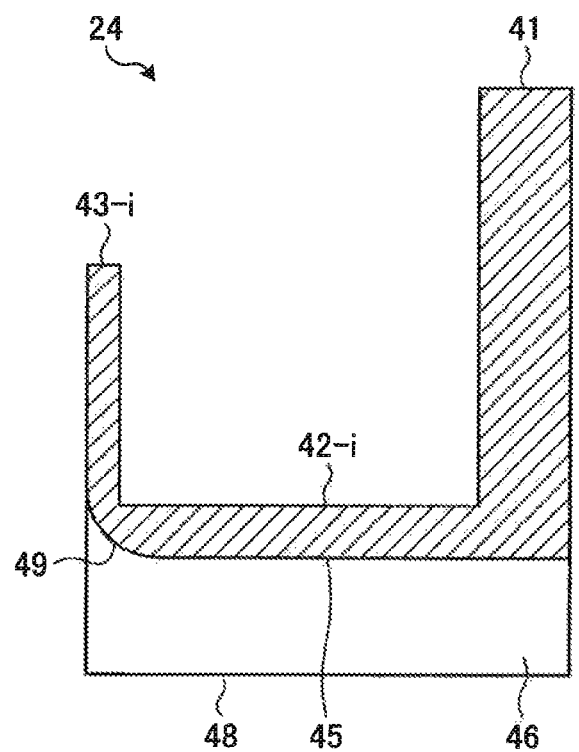
FIG. 6 is a sectional view illustrating a state where an insulator tooth portion is cut along a groove.

FIG. 6 is a sectional view illustrating a state where the insulator tooth portion 42-*i* is cut along the groove 45. As illustrated in FIG. 6, in the insulator tooth portion 42-*i*, an R portion 49 is formed at the other end of the groove 45 on the side of the flange portion 43-*i* so that the depth of the groove 45 becomes deeper as the groove approaches an end on a side of the flange portion 43-*i*. In other words, an area of the cross section where the grooves 45 intersect a plane of the insulator tooth portion 42-*i* which is perpendicular to a length direction is formed so as to become larger as the area approaches the other end on a side of the flange portion 43-*i*.

The lower insulator 25 is formed in the same manner as that of the upper insulator 24. In other words, in the lower insulator 25, a plurality of insulator tooth portions 42-1 to 42-9 and a plurality of claw portions 44-1 to 44-3 are formed in the same manner as that of the upper insulator 24. The present invention is not limited to this and the lower insulator 25 may be formed in a shape which is different from that of the upper insulator 24. For example, the groove 45 may not be formed in the lower insulator 25.

Stator

Figure 7:
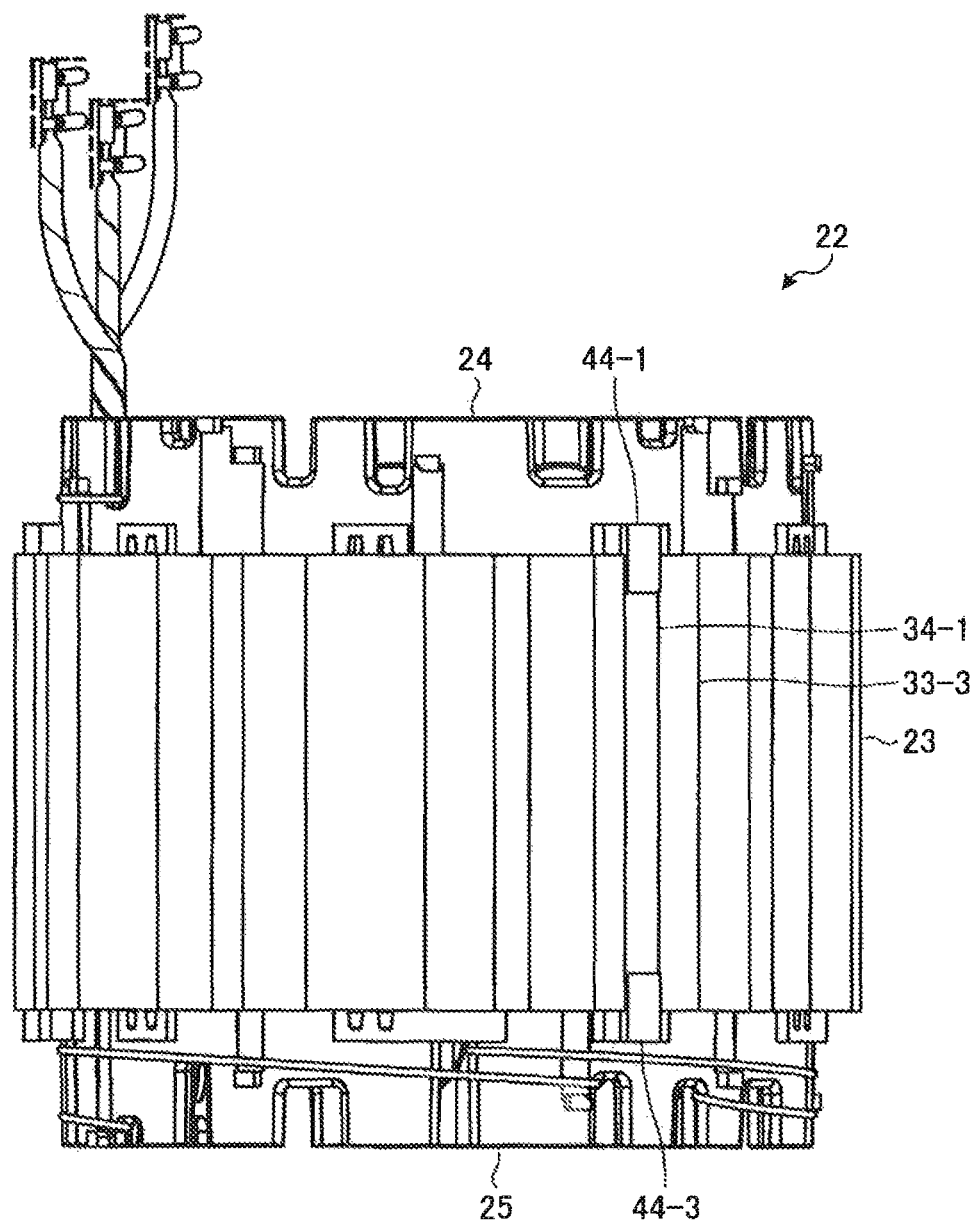
FIG. 7 is a side view illustrating a stator.

FIG. 7 is a side view illustrating a stator. As illustrated in FIG. 7, in the stator 22, the upper insulator 24 and the lower insulator 25 are attached to the stator cores 23 so that the stator core 23 is interposed between the upper insulator 24 and the lower insulator 25. In this case, the upper insulator 24 is attached to the stator core 23 so that the plurality of insulator tooth portions 42-1 to 42-9 of the upper insulator 24 are in contact with the plurality of the stator core tooth portions 32-1 to 32-9 of the stator core 23, respectively. In other words, in the insulator tooth portion 42-*i*, when the upper insulator 24 is attached to the stator core 23, the stator core contacting surface 48 is in contact with the stator core tooth portion 32-*i* of the stator core 23. In this case, the other end of the partition 46, which overlaps the stator core contacting surface 48 on the same plane is in contact with the stator core tooth portion 32-*i* and the partition 46 supports a bottom portion of the groove 45 of the insulator tooth portion 42-*i* by the stator core tooth portion 32-*i*.

Further, the upper insulator 24 is attached to the stator core 23 so that the plurality of claw portions 44-*i* to 44-3 are fitted into the plurality of concave portions 34-1 to 34-3 of the stator core 23, respectively. In other words, when the upper insulator 24 is attached to the stator core 23, the concave portion 34-*j* of the plurality of concave portions 34-1 to 34-3 is fitted into the claw portion 44-*j* of the plurality of claw portions 44-1 to 44-3 which is corresponding to the concave portion 34-*j*.

The lower insulator 25 is attached to the stator core 23 so that the plurality of insulator tooth portions 42-1 to 42-9 of the lower insulator 25 are in contact with the plurality of stator core tooth portions 32-1 to 32-9 of the stator core 23. Further, the lower insulator 25 is attached to the stator core 23 so that the plurality of claw portions 44-1 to 44-3 are fitted into the plurality of concave portions 34-1 to 34-3 of the stator cores 23, respectively.

Motor Portion

Figure 8:
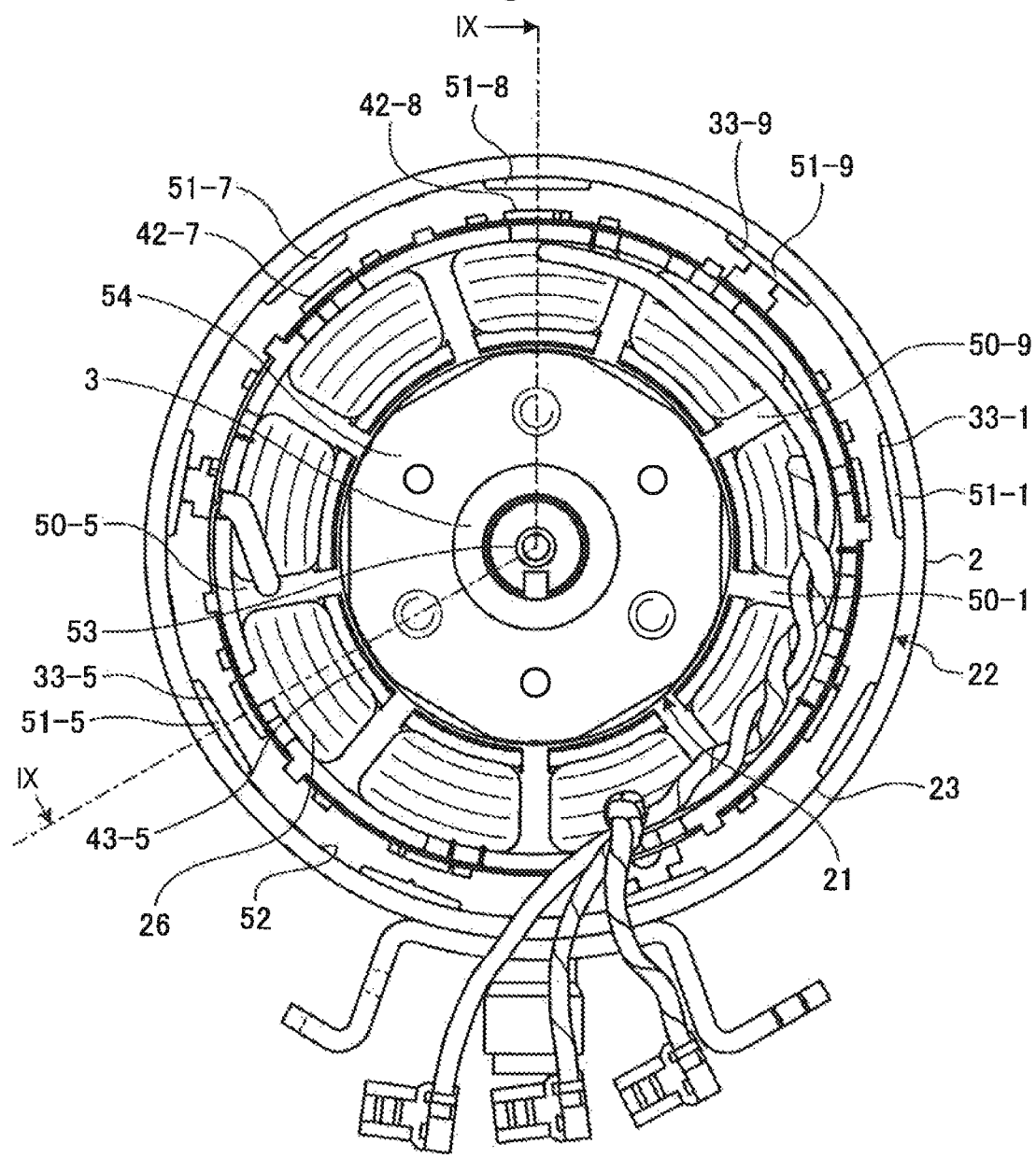
FIG. 8 is a plan view illustrating a motor portion.

FIG. 8 is a plan view illustrating a motor portion. As illustrated in FIG. 8, winding wires 26 are wound around the plurality of stator core tooth portions 32-1 to 32-9 of the stator core 23, respectively. The winding wires 26 are wound around the stator core tooth portion 32-*i* in a state where the stator core tooth portion 32-*i* is interposed between the insulator tooth portion 42-*i* of the upper insulator 24 and the insulator tooth portion 42-*i* of the lower insulator 25. The winding wires 26 wound around the stator core tooth portion 32-*i* is disposed so as to be interposed between the flange portion 43-*i* of the upper insulator 24 and the outer circumferential wall portion 41 and a so-called winding spillage that the winding wire disengages from the stator core tooth portion 32-*i* to a side of the rotor 21 is prevented by the flange portion 43-*i*.

As illustrated in FIG. 2, a plurality of slots 50-1 to 50-9 are formed on the stator 22. The plurality of slots 50-1 to 50-9 are respectively formed between the plurality of stator core tooth portions 32-1 to 32-9 and form a space that accommodates the winding wires 26 therein. Even after the winding wires 26 are accommodated in the plurality of slots 50-1 to 50-9, since space in which the winding wires 26 are not accommodated remains, space in the inner space above the motor portion 6 and space in the inner space 7 of the container 2 below the motor portion 6 communicate with each other.

Figure 9:
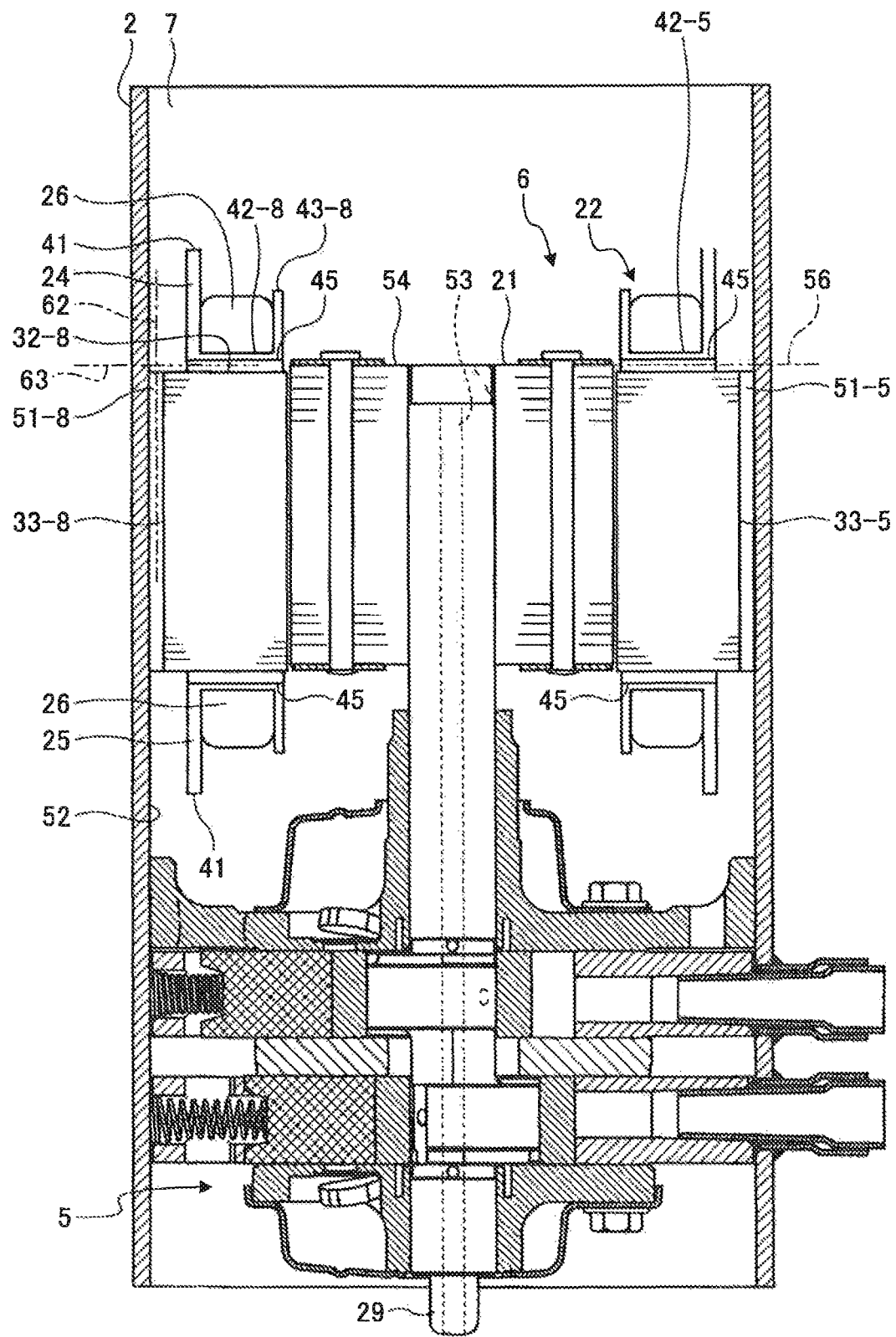
FIG. 9 is a sectional view taken along line IX-IX of FIG. 8.

FIG. 9 is a sectional view taken along line IX-IX of FIG. 8 (upper case 91 and lower case 93 are omitted). As illustrated in FIG. 8 and FIG. 9, the stator 22 is disposed so that a region on the outer circumferential surface of the yoke portion 31 of the stator core 23 where a plurality of cutout portions 33-1 to 33-9 are not formed is in close contact with the inner wall of the container 2 and is fixed to the container 2. A plurality of flow channels 51-1 to 51-9 are formed between the stator 22 and the container 2. The plurality of flow channels 51-1 to 51-9 correspond to the plurality of cutout portions 33-1 to 33-9 of the stator core 23. Any flow channel 51-*i* of the plurality of flow channels 51-1 to 51-9 is formed in space wound by the cutout portion 33-*i* of the plurality of cutout portions 33-1 to 33-9 corresponding to the flow channel 51-*i* and the inner circumferential surface 52 of the container 2. The plurality of flow channel 51-1 to 51-9 communicate the space in the inner space 7 of the container 2 above the motor portion 6 and the space in the inner space 7 below the motor portion 6 with each other, respectively. In this case, the stator core 23 and the upper insulator 24 are formed so that an imaginary line 62 obtained by virtually extending the flow channel 51-*i* in the axial direction and an imaginary line 63 obtained by virtually extending the groove 45 of the insulator tooth portion 42-*i* toward the inner circumferential surface 52 intersect each other.

A supply portion is formed on the shaft 3 which supplies lubricant oil to a top end surface 54 of the rotor 21 from the oil reservoir 8 formed in the inside portion of the container 2. For example, the shaft 3 has an oil feeding vertical hole 53. The rotor 21 has a top end surface 54 at the upper end thereof. As illustrated in FIG. 9, the oil feeding vertical hole 53 is formed so as to penetrate the shaft 3 in the longitudinal direction. In other words, the lower end of the oil feeding vertical hole 53 is disposed in the oil reservoir 8 and the upper end of the oil feeding vertical hole 53 is disposed in the vicinity of the top end surface 54 of the rotor 21. Further, the shaft 3 includes an oil feeding pump 29 having an oil feeding impeller (not illustrated). The oil feeding pump 29 is disposed at a lower end of an inside portion of the oil feeding vertical hole 53. The oil feeding pump 29 sucks the lubricant oil stored in the oil reservoir 8 into the oil feeding vertical hole 53 by rotation of the shaft 3 in order to circulate the lubricant oil in the container 2 and discharges the lubricant oil from the upper end of the oil supply vertical hole 53.

The rotor 21 is disposed such that an imaginary plane 56 overlapping the top end surface 54 overlaps the groove 45 of the upper insulator 24.

Operation of Compressor

The compressor 1 is installed in a refrigeration cycle apparatus (not illustrated) and is used to circulate the refrigerant in the refrigeration cycle apparatus by compressing the refrigerant. The motor portion 6 of the compressor 1 rotates the shaft 3 by suitably applying a three-phase voltage to the winding wires 26. In other words, the stator 22 of the motor portion 6 generates a rotating magnetic field by applying the three-phase voltage to the winding wires 26. The rotor 21 is rotated by the rotating magnetic field generated by the stator 22 and according to this, the shaft 3 is rotated.

When the shaft 3 rotates, the compressor portion 5 sucks the low-pressure refrigerant gas via the inlet pipe 11, compresses the suctioned low-pressure refrigerant gas to generate high-pressure refrigerant gas, and supplies the high-pressure refrigerant gas to the upper muffler chamber 16 and the lower muffler chamber 17. The lower muffler cover 15 decreases pressure pulsation of the high-pressure refrigerant gas supplied to the lower muffler chamber 17 and supplies the high pressure refrigerant gas having decreased pressure pulsation to the upper muffler chamber 16. The upper muffler cover 14 decreases the pressure pulsation of the high-pressure refrigerant gas supplied to the upper muffler chamber 16 and supplies the high-pressure refrigerant gas having decreased pressure pulsation to a space in the inner space 7 lower than the motor portion 6 via the compressed refrigerant discharge hole 18.

The high-pressure refrigerant gas discharged from the compressed refrigerant discharge hole 18 supplies to space on the inner space 7 above the motor portion 6 via a gap between the rotor 21 and the stator 22 and further via a plurality of slots 50-1 to 50-9 and a plurality of flow channels 51-1 to 51-9. The refrigerant supplied to the space in the inner space 7 above the motor portion 6 is discharged to an apparatus at a rear stage of the refrigeration cycle apparatus via the discharge pipe 12.

When the compressor portion 5 is lubricated, the lubricant oil stored in the oil reservoir 8 is mixed with the refrigerant and a portion of the lubricant oil is discharged via the discharge pipe 12 together with the refrigerant. The other portion of the lubricant oil stored in the oil reservoir 8 rises in the oil feeding vertical hole 53 and is discharged from an upper end of the shaft 3 by the rotation of the shaft 3. The lubricant oil discharged from the upper end of the shaft 3 is supplied to the top end surface 54 of the rotor 21. The lubricant oil supplied to the top end surface 54 of the rotor 21 is scattered along the imaginary plane 56 which overlaps the top end surface 54 toward the inner circumferential surface 52 due to a centrifugal force that rotates the rotor 21. A portion of the lubricant oil that is scattered from the top end surface 54 of the rotor 21 strikes the plurality of flange portions 43-1 to 43-9 of the upper insulator 24. A portion of the lubricant oil that strikes the plurality of flange portions 43-1 to 43-9 of the upper insulator 24 is sucked into the inner space 7 and the other portion of the lubricant oil is supplied into an inside portion of the groove 45 of the plurality of insulator tooth portions 42-1 to 42-9.

The lubricant oil supplied to the inside portion of the groove 45 flows through the two sub-grooves 47-1 to 47-2 formed in the inside portion of the groove 45 to come into contact with the inner circumferential surface 52 of the container 2. The lubricant oil which comes into contact with the inner circumferential surface 52 of the container 2 descends via the plurality of flow channels 51-1 to 51-9 and is supplied to the lower portion of the motor portion 6 of the inner space 7 of the container 2. In this case, most of the lubricant oil flowing through the inside portion of the groove 45 of the insulator tooth portion 42-*i* is supplied into the lower portion of the motor portion 6 of the inner space 7 of the container 2 through the flow channel 51-*i* by an end of the groove 45 on a side of an inside wall of the container 2 being disposed in the vicinity of the upper end of the flow channel 51-*i* (that is, by imaginary line 63 obtained by virtually extending grooves 45 intersecting imaginary line 62 obtained by virtually extending flow channel 51-*i*).

A portion of the lubricant oil in the inner space 7 which is disposed on the lower portion of the motor portion 6 is supplied to the inside portion of the groove 45 of the lower insulator 25 by the rotation of the shaft 3. The lubricant oil supplied to the inside portion of the groove 45 of the lower insulator 25 flows through the two sub-grooves 47-1 to 47-2 formed in the inside portion of the groove 45 and is supplied to the vicinity of the inner circumferential surface 52 of the container 2. The lubricant oil in the inner space 7 which is disposed on the lower portion of the motor portion 6 further descends and is supplied to the compressor portion 5.

A portion of the lubricant oil supplied to the compressor portion 5 is used for lubrication which decreases in friction between the mechanical elements constituting the compressor portion 5 and the other portion of the lubricant oil and the lubricant oil used for lubrication further descends and is stored in the oil reservoir 8.

Effect of Compressor

The compressor 1 of the embodiment includes the shaft 3, the motor portion 6, the compressor portion 5, and the container 2. The motor portion 6 has a rotor 21 that is fixed to the shaft 3 and a stator 22 that surrounds the rotor 21 and rotates the shaft 3. The compressor portion 5 compresses the refrigerant by rotation of the shaft 3. In the container 2, the shaft 3, the motor portion 6, and the compressor portion 5 are stored in the inner space 7. The stator 22 has the upper insulator 24, the stator core 23, and the winding wires 26. The upper insulator 24 has a plurality of insulator tooth portions 42-1 to 42-9. A plurality of stator core tooth portions 32-1 to 32-9 corresponding to the plurality of insulator tooth portions 42-1 to 42-9 are formed on the stator core 23. The winding wires 26 are wound around the stator core tooth portions 32-1 to 32-9 and the insulator tooth portions 42-1 to 42-9, respectively. In the insulator tooth portion 42-1, a groove 45 through which the lubricant oil for lubricating the compressor portion 5 passes is formed on the stator core contacting surface 48 which is in contact with the stator core tooth portion 32-$i$.

Such a compressor 1 circulates lubricant oil inside the container 2, and thus can suitably supply lubricant oil to the compressor portion 5 by the lubricant oil passing through the groove 45 formed on the stator core contacting surface 48 which is in contact with the stator core tooth portion 32-$i$ of the insulator tooth portion 42-$i$. In the present embodiment, as illustrated in FIG. 5, the height h of the insulator tooth portion 42-$i$ becomes gradually higher toward the center side in the circumferential direction as viewed in the cut surface in the circumferential direction. In other words, in the compressor 1, a surface of the insulator tooth portion 42-$i$, which is in contact with the winding wires 26 is formed as a gently curved surface 61. In such a compressor 1, the bending of the winding wires 26 becomes more gentle by the surface of the insulator tooth portion 42-$i$ which is in contact with the winding wires 26 being formed as a gently curved surface 61, and thus stress of the winding wires 26 can be decreased. Further, since the height h of the insulator tooth portion 42-$i$ of the upper insulator 24 increases toward the center in the circumferential direction, the groove 45 can be increased. Accordingly, the compressor 1 can increase the amount of lubricant oil passing through the groove 45.

In addition, the upper insulator 24 is further formed with the outer circumferential wall portion 41 with which the plurality of insulator tooth portions 42-1 to 42-9 is integrally formed and the plurality of flange portions 43-1 to 43-9 that is integrally formed on the plurality of insulator tooth portions 42-1 to 42-9. The winding wires 26 are wound around the insulator tooth portion 42-$i$ so that the winding wires 26 are disposed between the flange portions 43-1 to 43-9 and the outer circumferential wall portion 41.

In such a compressor 1, since the height h of the insulator tooth portion 42-$i$ is increased, even if the groove 45 is provided, the strength with which the flange portion 43-$i$ is coupled to the insulator tooth portion 42-$i$ can be improved. When the winding wires 26 are wound around the stator core tooth portion 32-$i$, a force for separating the flange portion 43-$i$ from the outer circumferential wall portion 41 from the winding wires 26 is applied to the upper insulator 24. In such a compressor 1, since a strength with which the flange portion 43-$i$ is coupled to the insulator tooth portion 42-$i$ is improved, deformation of the upper insulator 24 so that the flange portion 43-$i$ is separated from the outer circumferential wall portion 41 is prevented even in a case where the strength of the material of which the upper insulator 24 is formed is low (for example, in a case of PET). Also, regarding the lower insulator 25 of the compressor 1, deformation of the lower insulator 25 so that the flange portion 43-$i$ is separated from the outer circumferential wall portion 41 is prevented, similarly to the upper insulator 24.

In addition, in the stator core 23, a plurality of cutout portions 33-1 to 33-9 corresponding to the plurality of insulator tooth portions 42-1 to 42-9 are formed on a surface facing the container 2. In the cutout portion 33-$i$ of the plurality of cutout portions 33-1 to 33-9 corresponding to the insulator tooth portion 42-$i$, the groove 45 and the cutout portion are formed to be close to each other so that the lubricant oil passing through the groove 45 is supplied to the compressor portion 5. More specifically, the imaginary line 62 obtained by virtually extending the flow channel 51-$i$ formed by the cutout portion 33-$i$ and the inner circumferential surface 52 of the container 2 in the axial direction of the container 2 and the imaginary line 63 obtained by virtually extending the groove 45 of the stator core tooth portion 42-$i$ toward the inner circumferential surface 52 of the container 2 are formed to intersect each other. In such a compressor 1, the lubricant oil that is passed through the groove 45 of the insulator tooth portion 42-$i$ efficiently flows to the cutout portion 33-$i$ by the groove 45 of the upper insulator 24 approaching the cutout portion 33-$i$. Such a compressor 1 can efficiently circulate the lubricant oil inside the container 2 and can suitably supply lubricant oil to the compressor portion 5 by the lubricant oil efficiently flowing to the cutout portion 33-$i$.

Although the upper insulator 24 of the embodiment described above is formed of polybutylene terephthalate resin, the upper insulator may be formed of an insulating material which is different from polybutylene terephthalate resin. As the insulating material, polyphenylene sulfide resin (PPS) and liquid crystal polymer (LCP) are illustrated as examples. Even in a case where the upper insulator 24 and the lower insulator 25 are formed from such an insulating material, the compressor 1 can efficiently circulate the lubricant oil inside the container 2 and can suitably supply lubricant oil to the compressor portion 5.

In addition, the partition 46 is formed so as to divide the groove 45 into two sub-grooves 47-1 to 47-2. Since it is not hindered that the lubricant oil passes through the groove 45 by the partition 46 being formed so as to divide the groove 45 into the two sub-grooves 47-1 to 47-2, such a compressor 1 can suitably supply the lubricant oil to the compressor portion 5. Since the partition 46 is continuously formed from an inner circumferential side to an outer circumferential side of the groove 45, the strength of the upper insulator 24 can be increased.

In addition, the motor portion 6 further includes the rotor 21 which is fixed to the shaft 3. In the shaft 3, the oil feeding vertical hole 53 that supplies lubricant oil to the top end surface 54 formed on the rotor 21 is formed from an oil reservoir 8 formed in the inside portion of the container 2. The upper insulator 24 is formed so that the groove 45 overlaps the imaginary plane 56 along the top end surface 54. In such a compressor 1, since the groove 45 is formed so as to overlap the imaginary plane 56 along the top end surface 54 of the rotor 21, lubricant oil which is scattered toward the inner circumferential surface 52 by the centrifugal force from the top end surface 54 of the rotor 21 is likely to be introduced in the groove 45, and thus the lubricant oil can be suitably supplied to the compressor portion 5.

In addition, the upper insulator 24 is formed so that a sectional area of the cross section of the groove 45 in the circumferential direction becomes gradually larger as the groove approaches the rotor 21. In such a compressor 1, since an opening portion of an end on a side of the rotor 21 is formed so as to be larger, lubricant oil which is scattered from the top end surface 54 of the rotor 21 is likely to be introduced in the groove 45, and thus the lubricant oil can be suitably supplied to the compressor portion 5.

Although the upper insulator 24 described above is formed so that the sectional area of the groove 45 becomes gradually larger as the groove 45 approaches the rotor 21, it may be replaced with another insulator having a groove 45 with a constant sectional area in the circumferential direction. Even in a case where such a compressor 1 is provided with such an insulator, the lubricant oil can be efficiently circulated inside the container 2 via the groove 45 and lubricant oil can be supplied to the compressor portion 5, similarly to the case where the upper insulator 24 is provided.

In addition, the lower insulator 25 is further provided which is in contact with a side of the stator core 23 which is opposite to a side with which the upper insulator 24 is in contact. The lower insulator 25 is formed in the same manner as that of the upper insulator 24, that is, a plurality of insulator tooth portions 42-1 to 42-9 corresponding to the plurality of stator core tooth portions 32-1 to 32-9 are formed. The winding wires 26 are wound around the insulator tooth portion 42-$i$ of the plurality of insulator tooth portions 42-1 to 42-9 of the lower insulator 25 corresponding to the stator core tooth portion 32-$i$, together with the stator core tooth portion 32-$i$, the groove 45 through which the lubricant oil passes is formed on the stator core contacting surface 48 which is in contact with the stator core tooth portion 32-$i$.

In such a compressor 1, since the lower insulator 25 is formed in the same shape as the upper insulator 24, there is no need to separately manufacture the lower insulator 25 and the upper insulator 24, and thus the manufacturing cost can be decreased. In such a compressor 1, since the groove 45 through which the lubricant oil passes is also formed on the lower insulator 25, the lubricant oil can be efficiently circulated inside the container 2, and thus lubricant oil can be suitably supplied to the compressor portion 5. Although the lower insulator 25 of Embodiment 1 is formed in the same shape as the upper insulator 24, the lower insulator may be formed in a shape different from that of the upper insulator 24. For example, the groove 45 may not be formed in the lower insulator 25. In the compressor 1, even in a case where the groove 45 is not formed on the lower insulator 25, since the lubricant oil passes through the groove 45 of the upper insulator 24, the lubricant oil can be efficiently circulated inside the container 2, and thus lubricant oil can be suitably supplied to the compressor portion 5.

Although the partition 46 formed on the upper insulator described above partitions the groove 45 into two sub-grooves 47-1 to 47-2, the partition may be merely replaced with a supporting portion which supports the bottom portion of the groove 45 by the stator core 23. For example, the supporting portion may be formed in a cylindrical columnar shape, one end thereof may be formed integrally with the bottom portion of the groove 45 and when the upper insulator 24 is attached to the stator core 23, the other end thereof may be formed to be in contact with the stator core 23. One or a plurality of supporting portions may be provided. Further, when the upper insulator 24 is attached to the stator core 23, the supporting portion is formed so as not to block the flow channel surrounded by the groove 45 and the stator core 23, that is, so as to flow the lubricant oil into the groove 45. In such a compressor 1, even in a case where the upper insulator having such a supporting portion is provided, the lubricant oil can suitably be supplied to the compressor portion 5 in the same manner and it is possible to prevent the groove 45 from buckling.

Figure 10:
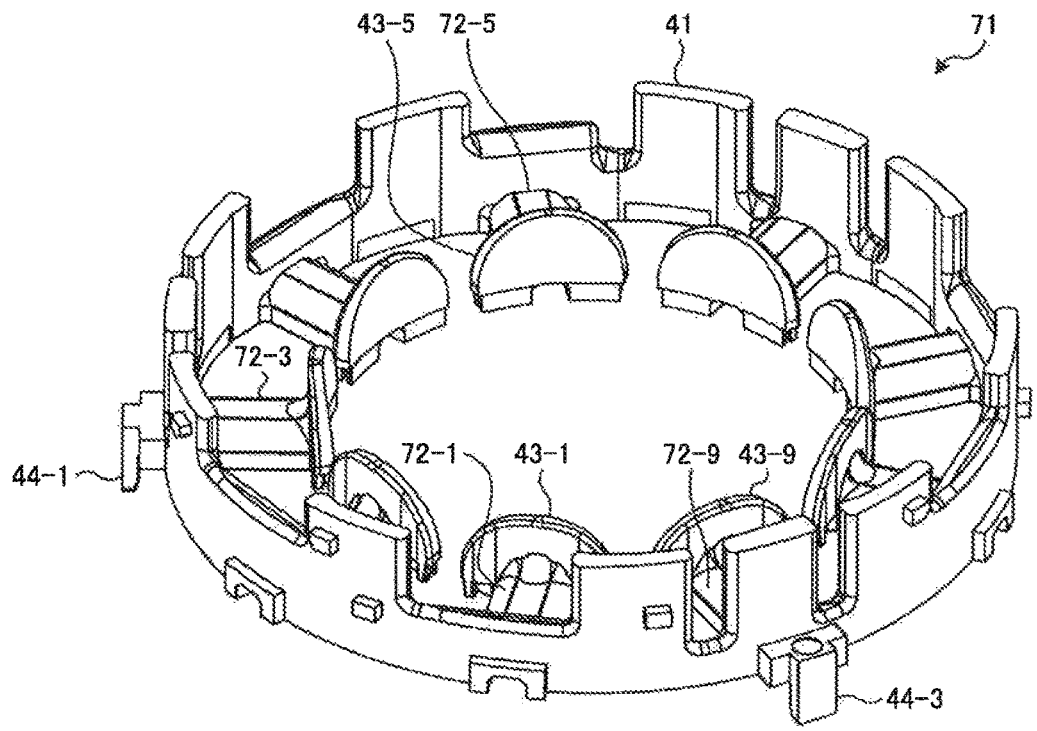
FIG. 10 is a perspective view illustrating modification example of the insulator.

FIG. 10 is a perspective view illustrating a modification example of the insulator. As illustrated in FIG. 10, an insulator 71 of the modification example is substantially formed in the same shape as the upper insulator 24 described above and the plurality of insulator tooth portions 42-1 to 42-9 are replaced with a plurality of other insulator tooth portions 72-1 to 72-9. Any insulator tooth portion 72-$i$ of the plurality of insulator tooth portions 72-1 to 72-9 is formed on a columnar body whose bottom surface is approximately semicircular. The insulator tooth portion 72-$i$ is formed so that one bottom surface thereof is formed integrally with the inner circumferential surface of the outer circumferential wall portion 41, that is, the insulator tooth portion 72-$i$ is formed to protrude from the inner circumferential surface of the outer circumferential wall portion 41. The flange portion 43-$i$ is formed integrally with the other end on a side which is opposite to the outer circumferential wall portion 41 of the insulator tooth portion 72-$i$ of the plurality of insulator tooth portions 72-1 to 72-9 corresponding to the flange portion 43-$i$.

Figure 11:
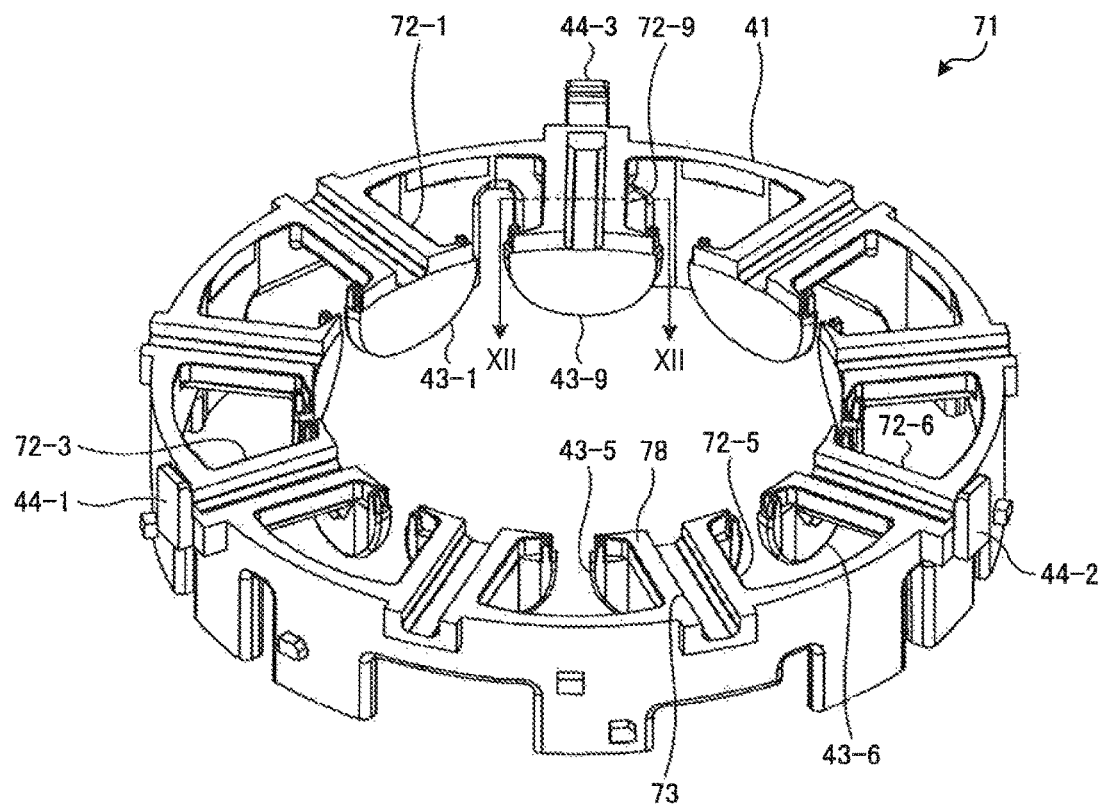
FIG. 11 is a perspective view illustrating a stator core contacting surface of the insulator of the modification example.

FIG. 11 is a perspective view illustrating a stator core contacting surface of the insulator of the modification example. As illustrated in FIG. 11, any insulator tooth portion 72-$i$ of the plurality of insulator tooth portions 72-1 to 72-9 has a stator core contacting surface 78. The stator core contacting surface 78 is formed to be flat, that is, the stator core contacting surface 78 is formed from a flat side surface of the side surfaces of the columnar body on which the insulator tooth portion 72-$i$ is formed. The insulator 71 is formed so that the stator core contacting surfaces 78 of each of the plurality of insulator tooth portions 72-1 to 72-9 overlaps on the same plane and so that the stator core contacting surface 78 of each of the plurality of insulator tooth portions 72-1 to 72-9 is flush with one end surface of the outer circumferential wall portion 41. Further, the insulator 71 is formed so that the stator core contacting surface 78 of the insulator tooth portion 72-$i$ overlaps the flat end surface of the end surfaces of the flange portion 43-$i$ on the same plane. Further, in the insulator tooth portion 72-$i$, a groove 73 is formed on the stator core contacting surface 78. The groove 73 is formed so as to connect from an end where the flange portion 43-$i$ of the insulator tooth portion 72-$i$ is integrally formed to an end which is integrally formed with the outer circumferential wall portion 41.

Figure 12:
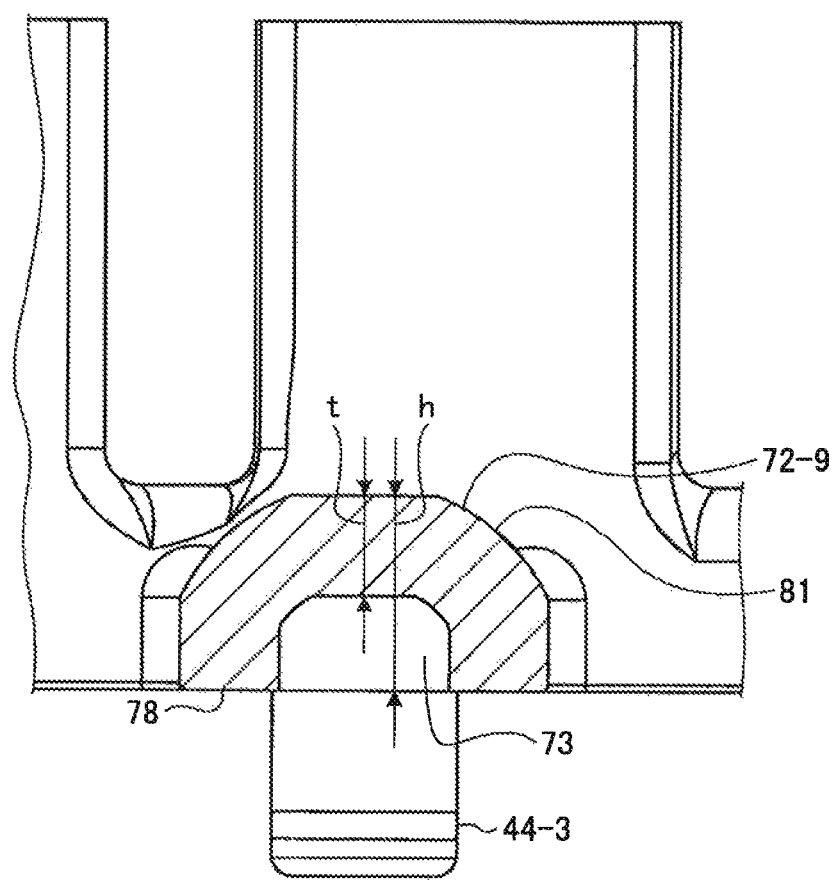
FIG. 12 is a sectional view taken along line of FIG. 11.

FIG. 12 is a sectional view taken along line XII-XII of FIG. 12. As illustrated in FIG. 12, a curved surface 81 is formed on the insulator tooth portion 72-9. The curved surface 81 is a surface of the surfaces of the insulator tooth portion 72-9 other than the stator core contacting surface 78 and is formed in a side of the insulator tooth portion 72-9 opposite to the stator core contacting surface 78 in the axial direction (axial direction of inner space 7). The curved surface 81 is gently bent so that the height h is increased toward the center side of the insulator tooth portion 72-9 in the circumferential direction. In other words, the insulator 71 of the modification example is one omitting the partition 46 from the upper insulator 24 described above. The other insulator tooth portions 72-1 to 72-8 are also formed in the same manner.

The insulator 71 is used in the same manner as that of the upper insulator 24 by replacing the upper insulator 24 described above. A portion of the lubricant oil striking the plurality of flange portions 43-1 to 43-9 of the insulator 71 is supplied into the inside portion of the grooves 73 of the plurality of insulator tooth portions 72-1 to 72-9, flows through the inside portion of the groove 73, and is supplied to the inner circumferential surface 52 of the container 2. The lubricant oil supplied to the inner circumferential surface 52 of the container 2 descends via the plurality of flow channels 51-1 to 51-9 in the same manner as a case of the compressor 1 having the upper insulator 24 and supplies to the compressor portion 5. In the compressor provided with the insulator 71, since the groove 73 through which the lubricant oil flows is formed, as in a case of the compressor 1 having the upper insulator 24, the lubricant oil is efficiently circulated inside the container 2 and a decrease in lubricant oil in the inside portion of the compressor 1 can be prevented.

Further, similarly to the upper insulator 24 of Embodiment 1, the insulator 71 is formed so that the height h of the insulator tooth portion 42-*i* becomes higher toward the center thereof in the circumferential direction. Accordingly, the size of the groove 73 can be increased while the thickness t of the insulator 71 is secured and the strength of the insulator 71 is improved. By the strength being improved, the insulator 71 is prevented from being deformed even in a case where the insulator is formed from a material having low strength (for example, PET). By the size of the groove 73 being increased, the insulator 71 can increase the amount of lubricant oil passing through the groove 73. Further, since the partition is not formed in the inside portion of the groove 73, the insulator 71 can increase the amount of the lubricant oil passing through the groove 73, compared to the upper insulator 24 of Embodiment 1 and the lubricant oil can be circulated more efficiently inside the container 2.

Although the compressor portion 5 is formed of a rotary compressor, it may be replaced with another compressor different from the rotary compressor. As the compressor, a scroll compressor is illustrated as an example. Even in a case where the compressor portion 5 is formed from such a compressor, the compressor 1 can efficiently circulate the lubricant oil inside the container 2 and the decrease in the lubricant oil can be prevented in the inside portion of the compressor 1 by forming a groove in the insulator.

What is claimed is:

1. A compressor comprising:
   a shaft;
   a motor portion that has a rotor fixed to the shaft and a stator surrounding the rotor;
   a compressor portion that compresses refrigerant by rotation of the shaft; and
   a container that stores the shaft, the motor portion, and the compressor portion therein,
   wherein the stator includes
      an insulator in which a plurality of insulator tooth portions are formed,
      a stator core in which a plurality of stator core tooth portions corresponding to the plurality of insulator tooth portions are formed, and
      a plurality of winding wires that are wound around the plurality of stator core tooth portions and the plurality of insulator tooth portions,
   wherein in at least one of the plurality of insulator tooth portions, a groove through which lubricant oil for lubricating the compressor portion passes is formed on a surface which is in contact with one of the plurality of stator core tooth portions.

2. The compressor according to claim 1,
wherein a partition that divides the groove into a plurality of sub-grooves is formed in the insulator.

3. The compressor according to claim 2,
wherein the partition is continuously formed from an inner circumferential portion to an outer circumferential portion of the stator core.

4. The compressor according to claim 1,
wherein in the shaft, a supply portion that supplies lubricant oil from an oil reservoir which is formed inside the container to an end surface of the rotor is formed, and
wherein the rotor is disposed so that an imaginary plane along the end surface overlaps the groove.

5. The compressor according to claim 1,
wherein the insulator is formed so that a sectional area of a cross section of the groove in a circumferential direction of the stator becomes gradually larger as the groove approaches the rotor.

6. The compressor according to claim 1,
wherein in the stator core, a cutout portion is formed on an outer circumference of the stator core corresponding to at least one of the plurality of insulator tooth portions, on which the groove is formed, of a surface facing the container, and
the cutout portion is formed so as to supply lubricant oil passed through the groove to the compressor portion.

7. The compressor according to claim 6,
wherein a first imaginary line obtained by virtually extending a flow channel formed by the cutout portion and an inner circumferential surface of the container in an axial direction of an inner space of the container, and a second imaginary line obtained by virtually extending the groove toward the inner circumferential surface of the container, are formed to intersect each other.

* * * * *